(No Model.)
C. C. TAINTOR.
SAW SET.
No. 499,482. Patented June 13, 1893.
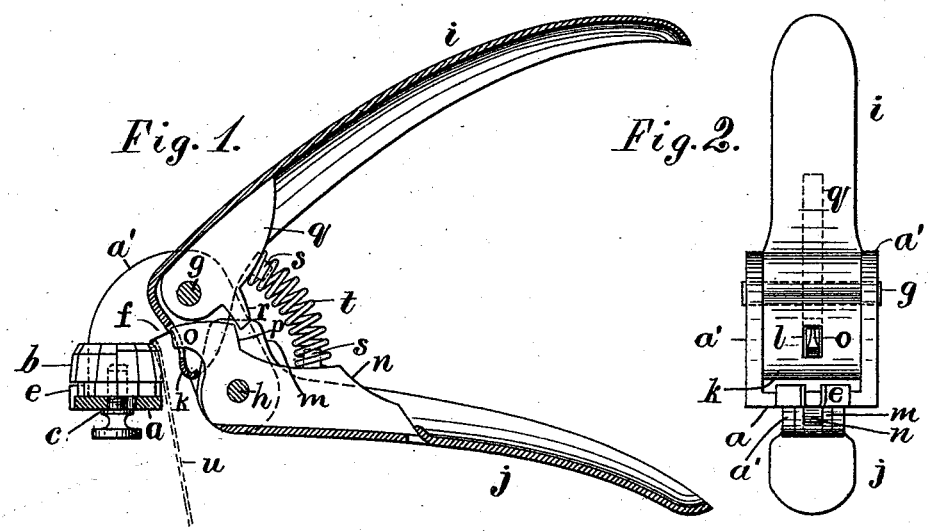
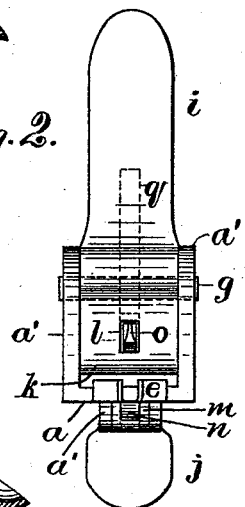
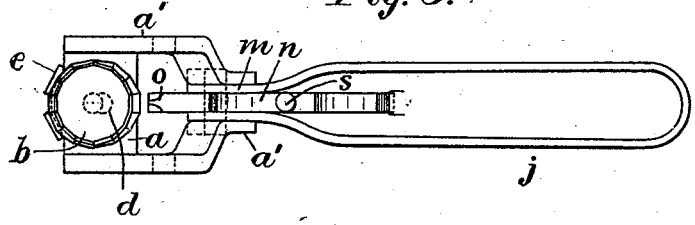
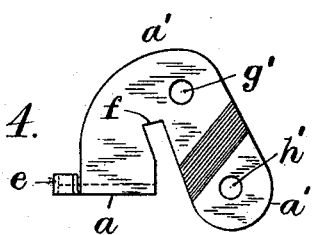
Attest:
L. Lee.
W. Batson
Inventor.
Charles C. Taintor, per
Crane & Miller, Attys.

UNITED STATES PATENT OFFICE.

CHARLES C. TAINTOR, OF ELIZABETH, NEW JERSEY, ASSIGNOR TO THE TAINTOR MANUFACTURING COMPANY, OF NEW YORK.

SAW-SET.

SPECIFICATION forming part of Letters Patent No. 499,482, dated June 13, 1893.

Application filed April 7, 1893. Serial No. 469,437. (No model.)

*To all whom it may concern:*

Be it known that I, CHARLES C. TAINTOR, a citizen of the United States, residing at Elizabeth, Union county, New Jersey, have invented certain new and useful Improvements in Positive Saw-Sets, fully described and represented in the following specification and the accompanying drawings, forming a part of the same.

This invention relates to a saw set having an adjustable setting die, and provided with two handles which are operated by grasping them in the hand.

The object of this invention is to furnish a means of clamping the saw blade and bending the tooth by a single movement of the handles.

Heretofore, as in United States Patent No. 475,359, issued to me May 24, 1892, two such handles have been connected respectively with a setting punch and bending punch movable parallel to one another toward the die, the handles being provided with springs of different strength to secure the movement of one punch in advance of the other. In the present invention I interpose a single spring between the handles and form each handle with a projection; one such projection operating as the clamping punch or jaw, and the other operating as the setting punch or jaw. By the present invention I am enabled to construct the principal parts of the saw set almost wholly of sheet metal, stamped by suitable tools into the desired shape, and thus manufacture such parts more cheaply and accurately.

The invention will be understood by reference to the annexed drawings, in which—

Figure 1 is a side elevation of the saw set, with the head and hand-levers in section at the center line where hatched. Fig. 2 is a front elevation of the saw set with the setting die removed. Fig. 3 is a plan of the saw set with the clamping lever and its attachments removed. Fig. 4 is a side elevation of the head detached from the other parts.

The different parts of the head are shown of uniform thickness to facilitate its manufacture from sheet metal, and the head comprises a flat seat $a$ to support a setting die, and ears $a'$ projected upward and backward from the same and formed with holes $g'$ and $h'$ to support pivots $g$ and $h$ for the clamping and setting levers. The ears are formed with a deep notch upon the under side, the upper edge of which notch forms the saw gage $f$. A polygonal setting die $b$ is secured upon the upper surface of the seat by the clamp screw $c$ passing through a transverse slot $d$ in the seat. Two lugs $e$ are formed upon the outer edge of the seat to fit adjacent sides of the die, and to support the die when adjusted, under the thrust of the hand levers. The upper corner of the setting die is provided with facets of different lengths, but formed at the same angle with the axis of the die. The pivots $g$ and $h$ are respectively above and below the saw gage $f$, and the setting jaw and clamping jaw upon the setting lever $i$ and bending lever $j$ are projected inward from such pivots toward one another. The clamping lever $i$ is shown formed of trough-shaped section to facilitate stamping it of sheet metal, with the sides near the front end perforated to fit the pivot $g$. At the forward end of the lever the sheet metal is extended across between the sides to form a clamping jaw $k$ having an aperture $l$ adjacent to the facets upon the setting die. The setting lever $j$ is also made of trough shape, and its sides at the forward end are projected upward into lugs $m$ perforated to fit the pivot $h$. A separate plate $n$ is fitted to the pivot $h$ and to the inner side of the lever $j$, and is provided at its forward end with a tongue $o$ adapted to project through the aperture $l$ into contact with the facets upon the die $c$. Such tongue forms the setting jaw, and is moved with the setting lever by the contact of the plate $n$ with the inner side of the lever. A shoulder $p$ is formed at the rear end of the tongue $o$, and a plate $q$ is fitted to the pivot $g$ inside the clamping lever $i$, and is provided with a tooth $r$ projected downward adjacent to the shoulder $p$. The plates $n$ and $q$ are provided, in the rear of the pivots $g$ and $h$, with studs $s$ between which a spiral spring $t$ is fitted to press the levers normally apart.

A saw $u$ touching the gage $f$, is represented in dotted lines in Fig. 1 adjacent to the side of the setting die, with the tooth bent into contact with the facet at the corner of the die.

The operation of the clamping and setting jaws to set the tooth, when the edge of the saw is placed in contact with the gage $f$, is effected by simply pressing the hand-levers $i$ and $j$ toward one another. In such movement, the clamping jaw presses the saw plate toward the lower side of the setting die, while the bending jaw (or tongue $o$) presses the tooth against the facet upon the setting die, and bends the tooth at the desired angle. By forming the different sides of the rotary die at different angles to their respective facets, teeth may be bent of any desired length and at any desired angle to the saw plate, and the operation of the hand-levers is thus rendered perfectly uniform in setting any saw. Such a circularly adjustable setting die is not claimed herein, as it is claimed in my Patent No. 475,359, issued May 24, 1892.

The studs $s$ are constructed at different distances from the pivots of the levers to which they are applied, the stud upon the upper lever being shown in the drawings nearer to the pivot of such lever. The effect of this construction is to permit the upper lever carrying the clamping jaw $k$ to turn first upon its pivot when the levers are pressed together, and the saw $u$ is thus first clamped against the side of the setting die $b$ and the setting jaw is then pressed against the tooth to bend it upon the adjacent facet. When one saw tooth is set and the pressure of the hand-levers relaxed, the reaction of the setting lever throws the shoulder $p$ against the inner side of the tooth $r$ and thus releases the clamping jaw from the saw plate. The saw set is thus freed from the saw to permit its rapid application to the succeeding tooth.

In saw sets heretofore used, the tooth has been sometimes first clamped, and the bending pressure then applied to the saw plate to bend the tooth. My saw set may be adapted to such a mode of operation by reversing the relation of the studs $s$ to the pivots of their respective levers, and permitting the setting jaw to first press the saw tooth upon the facet of the setting die, and the bending jaw to then operate upon the saw plate. It will be readily perceived that the plates $q$ and $n$ are made separate from the jaws simply to facilitate the construction of all the parts from sheet metal, and that if the parts were made by casting, such plates would not be necessary but that the setting jaw $o$ and the tooth $r$ might be formed integral with the hand-levers. I do not therefore limit myself to the details of construction shown in the drawings.

I have termed my device a positive saw set, as the saw blade and the tooth are both supported upon the same side during the setting operation, and the clamping jaw and setting jaw both press positively toward the same setting die, and thus operate to produce a bend of the same angle in the tooth whether the saw blade be thick or thin.

Having thus set forth the nature of my invention, what I claim herein is—

1. A saw set comprising a suitable head having an adjustable setting die and gage for the edge of the saw, pivots upon the head above and below the gage, the clamping lever $i$ having upon its forward end the broad hollow bending jaw $k$ provided with the aperture $l$ adjacent to the adjustable die, the lever $j$ having the setting jaw $o$ projected through the aperture $l$, and a spring to separate the levers, as herein set forth.

2. In a saw set, the combination, with a suitable head having a setting die and saw gage, and pivots upon the head above and below the gage, of the clamping lever $i$ provided with the tooth $r$ and having upon its forward end the hollow bending jaw $k$ provided with the aperture $l$, the lever $j$ having the setting jaw $o$ projected through the aperture $l$, and having the shoulder $p$ to engage the tooth $r$, and a spring to separate the levers, as herein set forth.

3. In a saw set, the combination, with a suitable head having a rotary setting die, a saw gage, and ears with pivots inserted above and below the gage, of the lever $i$ pivoted above the gage and provided with the hollow clamping jaw projected downward therefrom and provided with the aperture $l$, the lever $j$ pivoted below the gage and provided with the tongue $o$ forming the setting die and adapted to project through the aperture $l$, and a spring to separate the handles, substantially as herein set forth.

4. In a saw set, the combination, with a suitable head having a setting die and saw gage, and ears with transverse pivots above and below the gage, of the hollow sheet metal lever $i$ formed with a hollow clamping jaw $k$ having aperture $l$, with the plate $q$ fitted to the pivot within the lever and provided with tooth $r$ and stud $s$, the hollow sheet metal lever $j$ provided with the lugs $m$ to embrace the tooth $r$, and the plate $n$ fitted to the pivot within the lever $j$, and provided with the setting jaw $o$ and the stud $s$, and the spiral spring $t$ fitted to the studs, as set forth.

5. In a saw set, the combination, with the sheet metal head formed with the gage $f$, pivot ears $a'$, and seat $a$ having the lugs $e$ and slot $d$, of the sheet metal lever $i$ provided with clamping jaw $k$ having aperture $l$, the sheet metal lever $j$ provided with ears $m$, the plates $n$ and $q$ provided with the tooth $r$ and the setting jaw as described, the spring $t$ fitted to studs upon the plates, and the rotary setting die secured upon the seat by thumb screw $c$, the whole arranged and operated substantially as herein set forth.

In testimony whereof I have hereunto set my hand in the presence of two subscribing witnesses.

CHARLES C. TAINTOR.

Witnesses:
THOMAS S. CRANE,
L. LEE.